No. 698,644. Patented Apr. 29, 1902.
T. DUNCAN.
ELECTRIC METER.
(Application filed Sept. 16, 1898.)
(No Model.)

Witnesses:
Max W. Zabel.
Milton M. Alexander.

Inventor:
Thomas Duncan,
By Charles A. Brown & Cragg
Attorneys.

THE NORRIS PETERS CO., PHOTO-LITHO., WASHINGTON, D. C.

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,644, dated April 29, 1902.

Application filed September 16, 1898. Serial No. 691,070. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in induction motor-meters, and particularly to the type known in the art as "integrating wattmeters."

The object of the invention is to provide a simple method of and means for obtaining a magnetic field that lags ninety degrees behind the electromotive force which it represents for the purpose of enabling the meter to measure the true energy in circuits carrying both lagging and non-lagging currents.

Another object of the invention is to simplify its cost of construction by employing one volt-coil only and obtaining the necessary quadrature of the magnetism without the use of any auxiliary coil or coils carrying induced currents.

In my invention I employ the following elements: A series coil designed to carry the main current and whose magnetic field represents said current in amperes, a volt-coil traversed by a current that varies as the electromotive force at the terminals of the source of supply, an impedance-coil placed in series with the said volt-coil to lag the current passing through the latter, a shunt-circuit comprising and including the said volt-coil and impedance-coil, a second shunt-circuit comprising a variable resistance and a portion of the volt-coil, and a revoluble armature.

Figure 1:
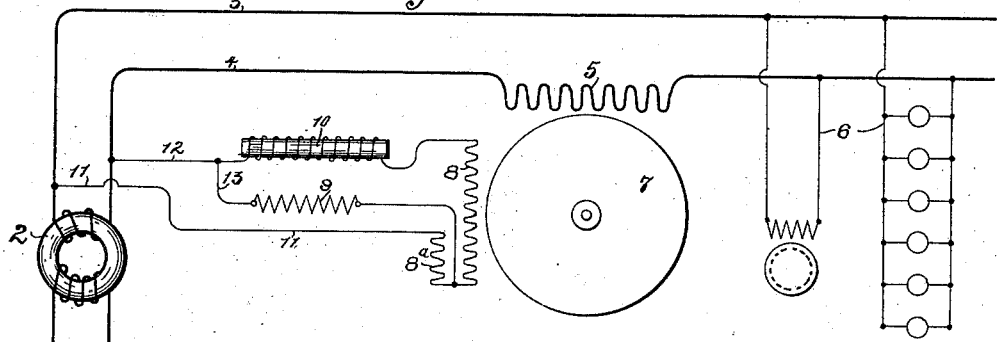
Figure 2:
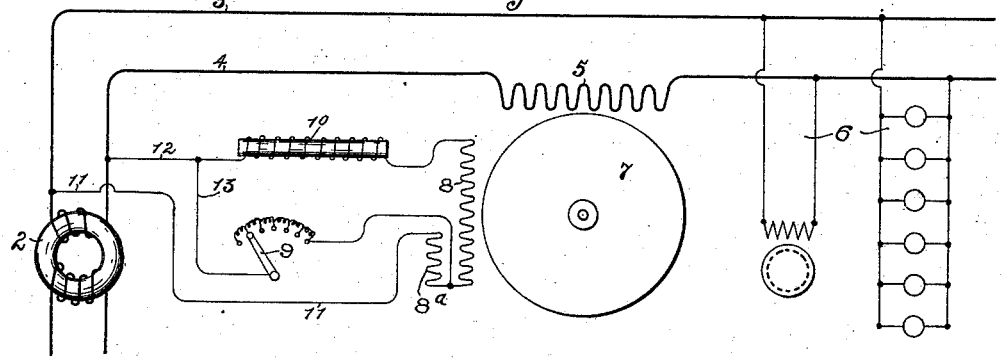
Figure 3:
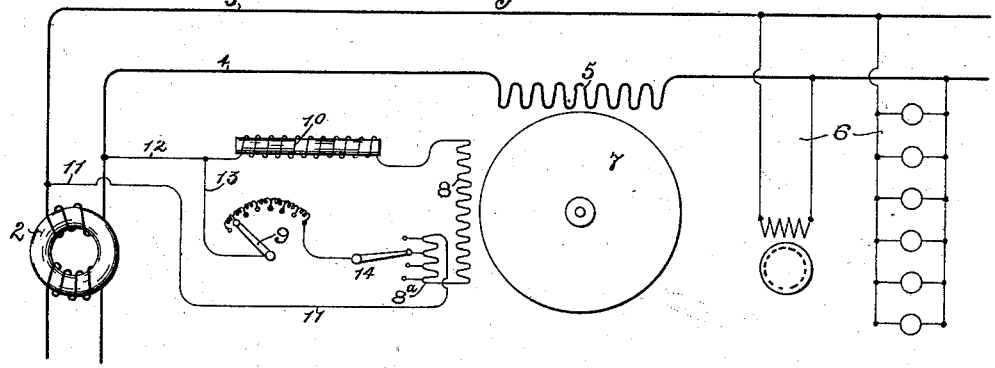
Figure 4:
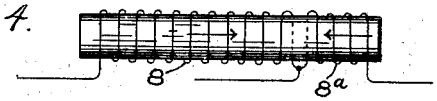
Figure 5:
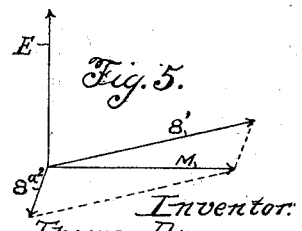

Referring now to the accompanying drawings, in which similar reference characters indicate like parts, Figure 1 is a diagrammatic view showing the manner in which the various circuits are connected. Fig. 2 shows a variable resistance in one of the shunt-circuits. Fig. 3 also shows a variable resistance in one of the shunt-circuits and also a variable means for putting into said circuit any desired number of turns of the volt-coil. Fig. 4 shows diagrammatically the manner in which I prefer to arrange the windings constituting the volt-coil and to be more fully explained hereinafter. Fig. 5 shows by means of the parallelogram of forces the different phase relations of the current and magnetism in the two shunt-circuits and the electromotive force of the system, being particularly employed to illustrate the phase relations of the apparatus shown in Fig. 2.

The operation of the invention is as follows, and with special reference to Fig. 1: The transformer 2, which supplies the translating devices 6, includes in one of its mains 3 and 4 the series coil 5 of the meter. This coil may partake of any form or arrangement usual in meter construction and is here shown in inductive relation to an aluminium cylinder or armature. A volt-coil 8 and $8^a$ furnishes the necessary magnetism to represent the electromotive force of the system. The said volt-coil receives its current in the usual manner by being connected in shunt to the supply-mains 3 and 4 by the wires 11 and 12.

It being well understood by those skilled in the art that the magnetism of the volt-coil must lag ninety degrees behind the electromotive force to enable the meter to measure inductive loads, it will therefore be unnecessary to give the reasons in detail here. The following description will therefore be confined to the manner in which I secure magnetic quadrature.

An impedance-coil 10 is connected in series with the volt-coil 8 and $8^a$ to cause the current through said volt-coil to lag as nearly as is possible to ninety degrees, and since it is impossible by this means to obtain ninety degrees I employ a second shunt-circuit 13 and 11, which includes a non-inductive resistance 9 and the portion $8^a$ of the volt-coil.

In a former application, filed August 22, 1898, No. 688,862, I have shown and described a method of obtaining a magnetic field in quadrature with the electromotive force by employing a volt-coil similar in construction to that shown in the present application, with the exception that the portion herein shown as 8ª was traversed and energized by a secondary current received by induction from the impedance-coil instead of a derived current from the mains supplying the translating devices.

The current through the circuit 12, 13, 9, 8ª, and 11 will be approximately in phase with the electromotive force, since it is practically non-inductive, while the current through the circuit 12, 10, 8, 8ª, and 11 will lag between eighty and ninety degrees, due to the impedance of the coil 10. By varying the resistance 9, and thus proportioning the amount of current through the portion 8ª of the volt-coil, the magnetism set up thereby coöperates with the magnetism through the portion 8, both combining into a resultant magnetic field of the required lag. This resultant is best understood by referring to Fig. 5, which particularly illustrates the phase relations of the apparatus of Fig. 2 and in which E represents the electromotive force, 8' represents the magnetism of the volt-coil 8, $8^{a2}$ represents the magnetism of the portion 8ª which is wound in opposition to the coil 8, thereby giving it an angle of one hundred and eighty degrees or direct opposition to the electromotive force of the system, and M represents the resultant magnetism of 8' and $8^{a2}$. This resultant magnetic field coöperates with the magnetic field of the series coil 5, and they in turn combine into a shifting magnetic field that actuates the armature 7 with a torque proportional to the real watts.

Fig. 2 shows a variable resistance 9 for quickly adjusting the resultant magnetism of the coil 8 and its portion 8ª to ninety degrees.

Fig. 3 has an additional variable-contact switch 14 for switching any suitable number of the turns of the portion 8ª of said coil 8 into service.

Fig. 4 shows the manner in which the volt-coil 8 and its portion 8ª are wound so as to set up opposing magnetic motive forces.

Having thus described my invention, what I desire to secure by Letters Patent is—

1. An electric meter comprising a revoluble armature, series and volt coils for actuating the armature, an impedance-coil connected in series with the volt-coil in a shunt-circuit across the line, and a resistance connected in a parallel shunt-circuit leading around the impedance-coil and connected to the volt-coil between its ends, substantially as described.

2. In an induction motor-meter, the combination of a series coil; a revoluble metallic armature; a volt-coil; an impedance-coil in series with the said volt-coil; a resistance shunted around the said impedance-coil and a portion of the said volt-coil, as set forth; and a portion 8ª of the said volt-coil that is traversed by the current flowing through the said impedance-coil and the said resistance, for the purpose described.

3. In an induction motor-meter the combination of a series coil; a revoluble armature; a volt-coil; an impedance-coil; a shunt-circuit including the said impedance-coil and the said volt-coil; a second shunt-circuit including a resistance and a portion of the said volt-coil for obtaining a resultant magnetic field that is in quadrature with the electromotive force at the terminals of the said shunt-circuits.

4. In an induction motor-meter the combination of supply-mains; a series coil; a volt-coil having a portion of its convolutions opposing the balance of its turns; an impedance-coil in series with the said volt-coil; a resistance in series with a portion of the convolutions of the said volt-coil, the said resistance and said portion of said volt-coil being connected in multiple to the said supply-mains; and a revoluble armature in inductive relation to the said series and volt coils.

5. In an induction motor-meter the combination of a series coil; a revoluble metallic armature; a volt-coil; an impedance-coil in series with the said volt-coil; a shunt-circuit including a variable resistance 9 and a portion of the said volt-coil; the said portion of said volt-coil being preferably wound to establish a counter magnetomotive force to the balance of the turns comprising the said volt-coil, as described.

6. In an induction motor-meter the combination of a series coil; a volt-coil of the class described; an impedance-coil in series with said volt-coil; a shunt-circuit comprising and including a variable resistance and a portion of the said volt-coil as described; a revoluble armature in inductive relation to the said series and volt coils; and the herein-described means of varying the number of turns of the said volt-coil employed in series with said variable resistance.

7. In a motor, the combination with an armature, of windings for actuating the same, turns of an impedance-coil connected in series with one of the windings, and a resistance connected at one terminal between the terminals of the winding in circuit with the impedance, whereby turns of the winding are disposed upon each side of the said resistance-terminal, the said resistance being included in a closed circuit with a portion of the latter field-winding and the impedance-winding turns.

8. In a meter, the combination with an armature, of current and pressure windings for actuating the same, turns of an impedance-coil connected in series with one of the windings, and a resistance connected at one terminal between the terminals of the pressure-winding, whereby turns of the pressure-winding are disposed upon each side of the said resistance-terminal, the said resistance being included in a closed circuit with a portion of the pressure-winding and the impedance-winding turns.

9. In a motor, the combination with an armature, of windings for actuating the same, a phase-modifying device connected in series with one of the windings, and a second phase-modifying device connected at one terminal between the terminals of the winding in circuit with the first phase-modifying device, whereby turns of said winding are disposed upon each side of the said terminal of the second phase-modifying device, the latter device being included in a closed circuit with a portion of said field-winding and the first phase-modifying device, substantially as described.

Signed by me at Fort Wayne, Allen county, State of Indiana, this 13th day of September, A. D. 1898.

THOMAS DUNCAN.

Witnesses:
CHARLES JONES,
CHARLES C. MILLER.